(12) United States Patent
Hochmuth et al.

(10) Patent No.: US 8,285,857 B2
(45) Date of Patent: Oct. 9, 2012

(54) SAVING A LAYOUT OF DISPLAY(S) OF A REMOTE COMPUTER

(75) Inventors: Roland M. Hochmuth, Fort Collins, CO (US); Byron A. Alcorn, Fort Collins, CO (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 224 days.

(21) Appl. No.: 12/262,921

(22) Filed: Oct. 31, 2008

(65) Prior Publication Data

US 2010/0115020 A1    May 6, 2010

(51) Int. Cl.
*G06F 15/16* (2006.01)

(52) U.S. Cl. ........ 709/228; 709/229; 709/213; 709/217; 709/218; 709/219

(58) Field of Classification Search .................. 709/228, 709/212, 246, 213, 217, 218, 219, 229
See application file for complete search history.

(56) References Cited

U.S. PATENT DOCUMENTS

| | | | | |
|---|---|---|---|---|
| 2007/0079252 A1* | 4/2007 | Ramnani | | 715/781 |
| 2007/0220168 A1* | 9/2007 | Parsons et al. | | 709/246 |
| 2008/0239074 A1* | 10/2008 | Li et al. | | 348/143 |
| 2009/0287834 A1* | 11/2009 | Alcorn et al. | | 709/229 |
| 2010/0077085 A1* | 3/2010 | Cohen | | 709/227 |

OTHER PUBLICATIONS

Remote Graphic software, HP WHitepaper published Aug. 2007, pp. 1-3.*
Hewlett-Packard, HP Remote Client Solutions, www.hp.com/go/remoteclients, pp. 1-4 (Sep. 2007).
Hewlett-Packard,HP Consolidated Client Infrastructure Overview, HP Blade PCs, www.hp.com/cgi-bin/pf-new.cgi?in=http://h71028.www7.hp.com/enterprise/cache/2,pp. 1-2 (Jun. 30, 2008).
Hewlett-Packard,HP Blade Workstation Solution Overview,HP Blade Workstation Solution Overview,www.hp.com/cgi-bin/pf-new.cgi?in+http://h71028.www7.hp.com/enterprise/cache/4,etc.
Hewlett-Packard, Administrator's Guide HP Session Allocation Manager (HP SAM) v.2.2, pp. 1-83 (Aug. 2007).
Hewlett-Packard, HP Session Allocation Manager Software, www.hp.com/cgi-bin/pf-new.cgi?in=http://h71028.www7.hp.com/enterprise/cache/3, pp. 1-2 (at least as early as Jun. 30, 2008).
Hewlett-Packard, Advantages and Implementation of HP Remote Graphics Software, pp. 1-11 (May 2007).
Hewlett-Packard, HP Remote Graphics Software 5.1.3 User Guide, pp. 1-161 (Mar. 2008).
Hewlett-Packard, Remote Graphics Software, www.hp.com/cgi-bin/pf-new.cgi?in=http://h20331.www2.hp.com/Hpsub/cache/2865, pp. 1-3 (at least as early as Jun. 30, 2008).
Hewlett-Packard, HP Consolidated Client Infrastructure, pp. 1-8 (Mar. 2007).

* cited by examiner

*Primary Examiner* — Djenane Bayard

(57) ABSTRACT

To control a display layout of at least display associated with a remote computer, a client computer receives at least one user setting for the display layout of the at least one display associated with the remote computer. The client computer obtains, from the remote computer, information relating to properties of the display layout of the at least one display. The client computer sends information relating to the layout to a remote server for storage at the remote server for later retrieval.

20 Claims, 3 Drawing Sheets

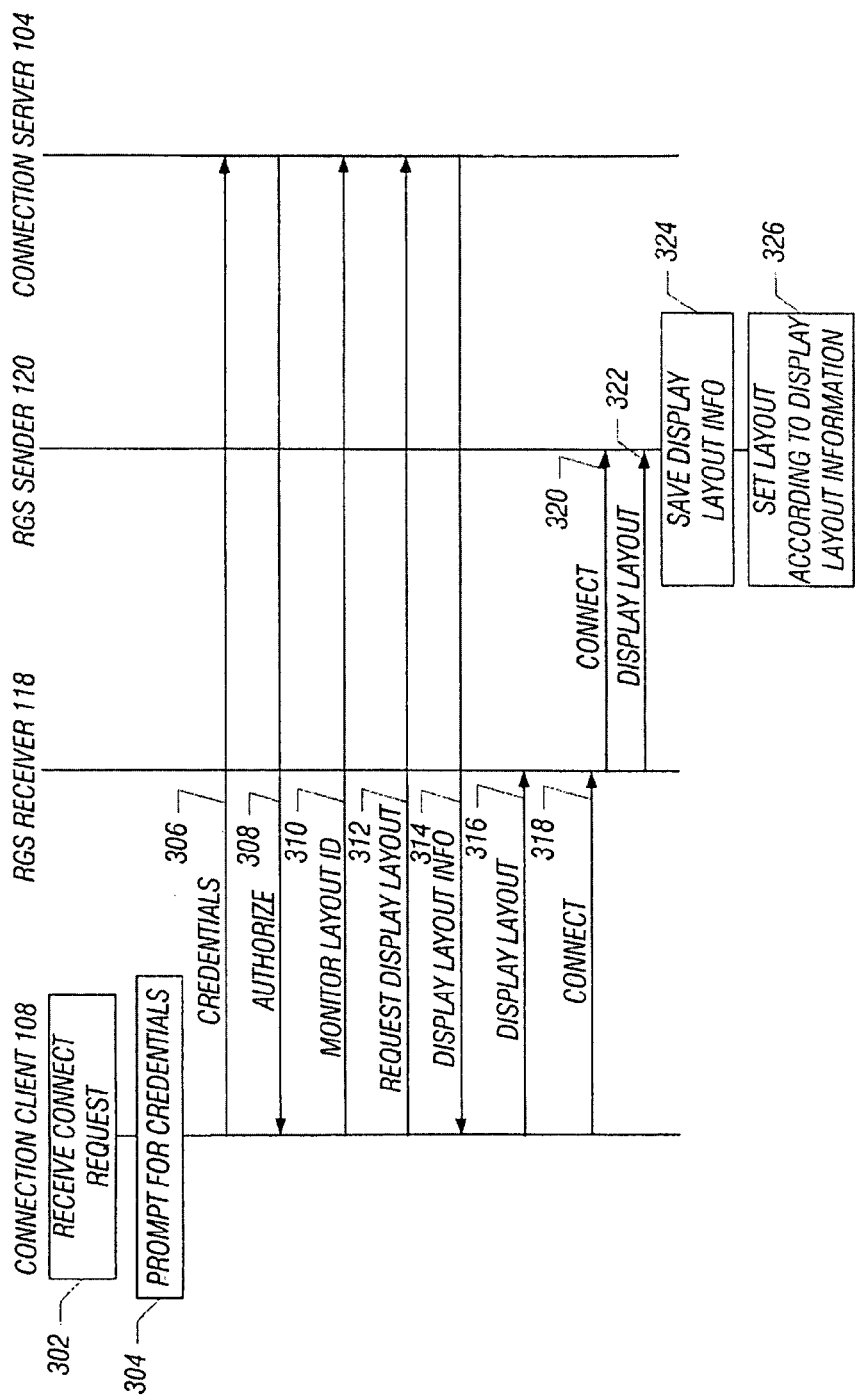

SAVING A LAYOUT OF DISPLAY(S) OF A REMOTE COMPUTER

BACKGROUND

Many enterprises are transitioning to a network arrangement in which computing resources of central servers are provided to thin clients (or access devices) at which users are located. A thin client is a computer having a reduced amount of processing and storage resources when compared to full-featured client computers. The computing resources (e.g., software applications, processing resources, storage resources, etc.) that are centralized at one or more central servers can be selectively allocated to a session established by a user at a thin client. Typically, installing and deploying applications and user environments on a central server (or group of central servers) is much more convenient than installing and deploying applications and user environments on hundreds or even thousands of client computers at different sites across an enterprise.

Protocols are provided to enable a user at a thin client to access and share the desktop of a remote computer (e.g., a central server) over a computer network. One such protocol is the Remote Desktop Protocol (RDP), as provided by Microsoft Corporation, to provide remote display and input capabilities over network connections. Another protocol that can be used is the Remote Graphics Software (RGS) protocol from Hewlett Packard Co. RGS is designed to take full advantage of the computer and graphics resources of a remote computer to deliver interactive remote access from the thin client. The desktop image of the remote computer is transmitted over the network to the thin client, which displays the desktop image locally in a window at the thin client. RGS is designed to provide fast capture, compression, and transmission of a desktop image over a network. RGS also captures user keyboard and mouse inputs at the thin client, and sends the keyboard and mouse inputs to the remote computer for processing, by the operating system of the remote computer, and by applications running on the remote computer. In addition to advanced graphics capabilities, RGS also supports multiple monitors at the thin client to display the desktop image of the remote computer.

Because a thin client can possibly connect to multiple different remote computers, it is often difficult to configure the preferred layout of display(s) associated with a remote computer that is being accessed by a user at the thin client. As a result, a desktop image of the remote computer displayed at a thin client may not have the desired layout. Moreover, for scenarios in which multiple displays are associated with the remote computer, there may be ambiguity in the order of the multiple displays, which may cause the desktop image not to be displayed properly at the monitors of the thin client.

BRIEF DESCRIPTION OF THE DRAWINGS

Some embodiments of the invention are described, by way of example, with respect to the following figures:

FIG. 3 is a message flow diagram of a process of a client terminal establishing a connection with a remote computer, in which the layout of physical display(s) previously stored is retrieved from a server, in accordance with an embodiment.

DETAILED DESCRIPTION

In accordance with some embodiments, a technique or mechanism is provided to enable a user at a client computer (such as a thin client or other type of terminal) to save display layout properties of physical display(s) of a remote computer, such that the saved display layout properties can later be retrieved when the user reconnects to the remote computer. Saving the display layout properties for a particular user allows for explicit control of the display layout of the remote computer. Display layout properties of the physical display(s) of a remote computer include the following examples: the resolution of the physical display(s), display orientation (portrait versus landscape), bits per pixel, refresh rate of a display, and so forth. The display layout properties can also specify an order of physical displays so that a desktop image of the remote computer can be properly displayed on monitor(s) of the client computer.

Layout properties associated with a local window displayed at monitor(s) of the client computer can also be saved. Such properties include the coordinates of the local window (e.g., X, Y location of a corner of the local window), the width and height (resolution) of the local window, and so forth. The local window at the monitor(s) of the client computer is used to display the desktop image associated with the physical display(s) of the remote computer.

Collectively, the display layout properties and local window layout properties are referred to as "display layout information," which can be saved in accordance with some embodiments for subsequent retrieval for use in a connection between a thin client and one or more remote computers.

Figure 1:
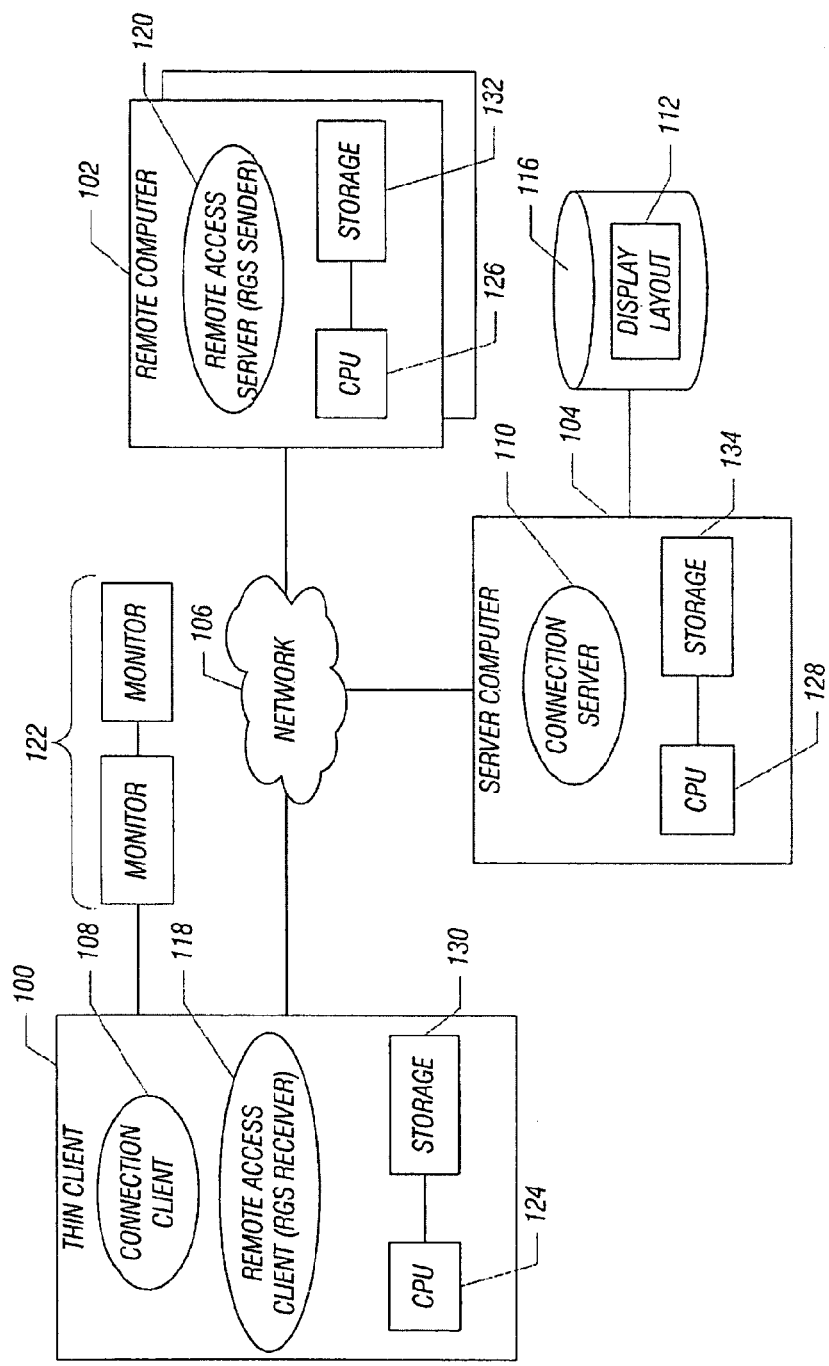
FIG. 1 is a block diagram of an exemplary arrangement that includes a thin client, a blade, and a server, in accordance with an embodiment.

FIG. 1 illustrates an exemplary arrangement that includes a thin client 100, remote computers 102, and a server computer 104. Although reference is made to "thin client 100," it is noted that in other embodiments, the thin client 100 can be replaced with another type of client computer. In one example, each remote computer 102 can be a blade, which can be part of a larger system, such as a rack, that holds multiple blades. A "blade" refers to a computer that has a relatively small profile to enable the blade to be easily loaded into a rack that can hold a relatively large number of blades. In other implementations, the remote computers 102 can be other types of computers. The thin client 100 is able to access resources of any of the blades (remote computers) in sessions established between the thin client 100 and the remote computers 102 (note that it is possible for the thin client 100 to establish a session with just one remote computer, or alternatively, with multiple remote computers). The thin client 100, remote computers 102, and server computer 104 are interconnected by a network 105.

Various software modules are loaded on the thin client 100, remote computers 102, and server computer 104. The thin client 100 includes a connection client module 108, which is used to receive authentication credential information from a user that wishes to connect to a remote computer, such as by presenting an initial dialog that is displayed to a user to collect user information. The connection client module 108 is invoked in response to a user request (such as by clicking a menu control item, a hyperlink, etc.) that indicates the user's desire to establish a session (or connection) with a remote computer (e.g., remote computer 102).

In one exemplary embodiment, the connection client module 108 can be a session allocation manager (SAM) client module. SAM is a software management tool provided by the Hewlett Packard Co. that enables remote client solutions, such as the remote computer 102 providing computing resources to the thin client 100.

A connection server module 110 that corresponds to the connection client module 108 runs in the server computer 104. The connection client module 108 accesses the connection server 110 to determine which remote computer 102 (or remote computers 102) the thin client 100 should connect to in a requested session. Moreover, in accordance with some embodiments, the connection server 110 is able to retrieve display layout information 112 from a database 116 to send back to the connection client module 108. The display layout information 112 received by the connection client module 108 is used by the thin client 100 to control the display layout of monitors) 122 connected to the thin client 100. The display layout information 112 was previously stored in response to a user save command at the thin client 100. The display layout information 112 includes layout properties of the display(s) of the remote computer(s) 102, as well as layout properties of the local window to be displayed in the monitor(s) 122 of the thin client 100. The "local window" refers to the window displayed by the monitor(s) 122 attached to the thin client 100 for presenting information of the display(s) of the remote computer 102.

In this manner, the display layout of the physical display(s) of a remote computer (e.g., 102) can be explicitly configured by a user (according to preferences of the user) and saved for later retrieval when the user at the thin client 100 attempts to reconnect to the remote computer 102. In other words, the display layout configured by a user for a remote computer can be saved and later restored. Flexibility and convenience is enhanced since different users can save different display layouts according to different user preferences. Note also that each particular user is able to configure and save different layouts for different remote computers. In other words, if the particular user accesses a first remote computer 102, a first saved display layout can be retrieved for use at the thin client 100. However, if the particular user were to access a second remote computer 102, then a second (possibly different) saved display layout can be retrieved for use at the thin client 100.

Although reference is made to physical display(s) of the remote computer, it is noted that physical monitors do not actually have to be attached to the remote computer. For example, a blade is an example of a remote computer without actual physical monitors) attached. In such a scenario, a specialized driver can be provided in the remote computer to enable the physical display(s) even though no physical monitor(s) are attached to the remote computer. Thus, the phrase "physical display(s) associated with a remote computer" or "physical display(s) of a remote computer" can refer to either actual physical display(s) connected to the remote computer or non-existent physical display(s).

Other software modules that are deployed in the exemplary arrangement of FIG. 1 include a remote access client module 118 in the thin client 100, and remote access server module 120 in each remote computer 102. In one embodiment, the remote access client module 118 can be a Remote Graphics Software (RGS) receiver that is able to receive desktop images from an RGS sender, which is one example of the remote access server module 120. An RGS sender is able to communicate desktop images of the remote computer 102 over the network 106 to the RGS receiver 118 in the thin client 100 for display on one or more monitors 122 of the thin client 100. The RGS receiver 118 is also able to receive mouse and keyboard inputs made at the thin client 110 for transmission over the network 106 to the RGS sender 120 in the remote computer 102. RGS, developed by the Hewlett Packard Co., is designed to take advantage of the computer and graphics resources of a remote computer to deliver interactive remote access from the thin client. RGS is designed to provide fast capture, compression, and transmission of a desktop image over a network.

In the ensuing discussion, reference is made to RGS receiver and RGS sender. However, in alternative implementations, other types of remote access client and remote access server modules can be used.

The various software modules mentioned above are executable on corresponding central processing units (CPUs) 124, 126, and 128 in the thin client 100, remote computer 102, and server computer 104, respectively. The CPUs 124, 126, and 128 are connected to respective storage devices 130, 132, and 134, respectively.

Although the server computer 104 is depicted as being separate from the remote computer 102, note that in a different implementation, the server computer 104 can be integrated with one of the remote computers 102 (in other words, the connection server module 110 can be run on one of the remote computers 102).

Figure 2:
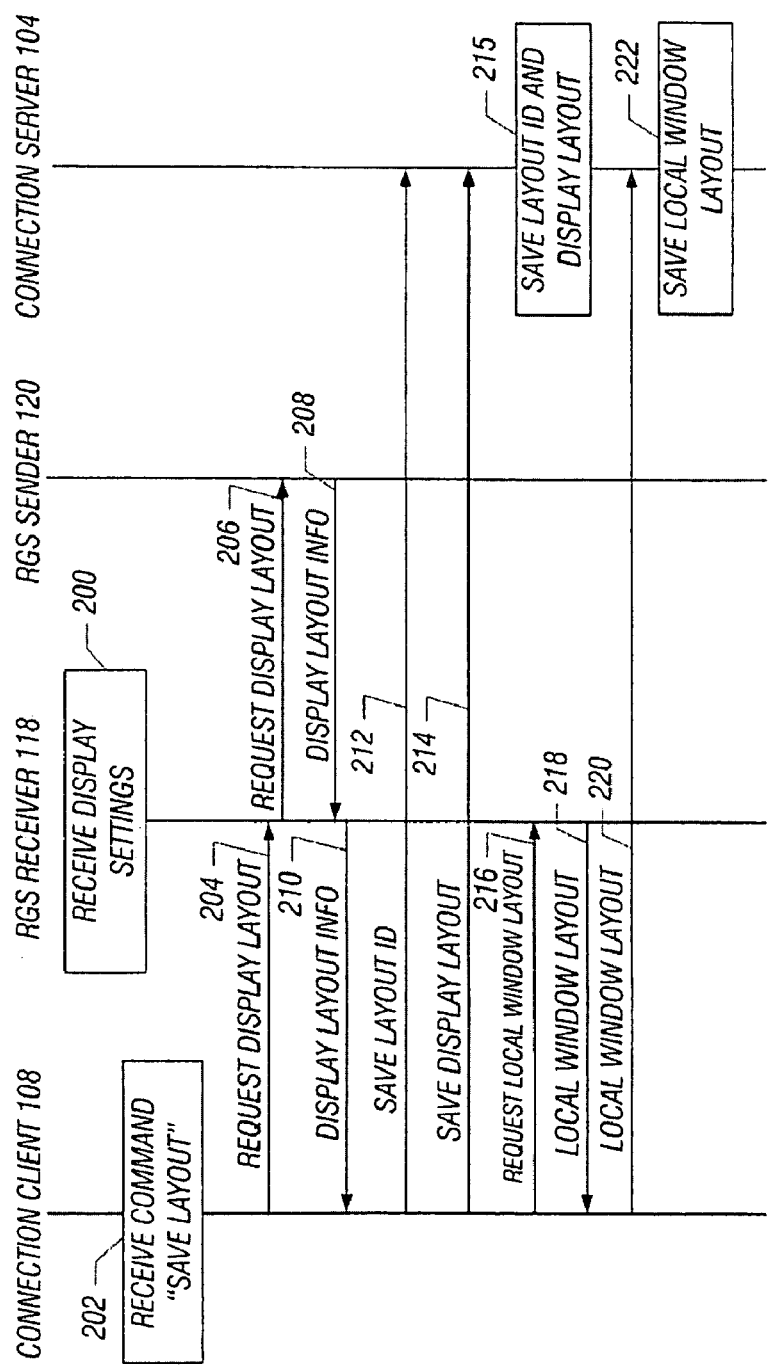
FIG. 2 is a message flow diagram of a process of saving a layout of physical display(s) associated with a remote computer, in accordance with an embodiment.

FIG. 2 is a flow diagram of a process of saving a layout of physical display(s) of a remote computer 102 to the server computer 104. The RGS receiver 118 at the thin client 100 receives (at 200) user settings of layout properties of a local window displayed by the display monitor(s) 122 of the thin client 100, and of layout properties of the physical display(s) of the remote computer 102.

The received settings, can include the positions (coordinates) of the local window, the resolution (width and height) of the local window, the display resolution of the display(s) of the remote computer 102, and other layout properties as discussed above. At some point, the user selects a "save layout" command at the thin client 100, which can be accomplished by a user clicking on a "save layout" button of a graphical user interface (GUI) or by other type of input.

In response to receiving (at 202) the "save layout" command, the connection client 108 sends a layout request (at 204) to obtain the display layout properties of the physical display(s) of the remote computer 102. The layout request sent at 204 is sent from the connection client module 108 to the RGS receiver 118, both running in the thin client 100. In response to the layout request at 204, the RGS receiver 118 forwards (at 206) the layout request to the RGS sender 120 for obtaining the display layout of the physical display(s) of the remote computer 102.

In response, the RGS sender 120 sends (at 208) display layout information of the physical display(s) of the remote computer 102 back to the RGS receiver 118, which in turn sends (at 210) the display layout information to the connection client module 108.

A monitor layout identifier can be used to identity the particular layout of the monitor(s) 122 of the thin client 100. For example, if there are four monitors 122 connected to the thin client 100, then there can be several potential monitor layouts: (1) 2×2 (e.g., the desktop image(s) of the physical displays of the remote computer(s) is (are) displayed in local window(s) displayed in an array of thin client monitors arranged as two rows and two columns); (2) 1×2 (e.g., the desktop image of the physical displays of the remote computer is displayed in a local window that covers one row of two monitors); (3) and so forth.

The properties for different monitor layouts are also different, so that the saved display layout information is according to both monitor layout identifier and user. In other words, given a particular combination of a user and monitor layout identifier, the corresponding display layout information can be saved.

Upon receiving the display layout information, the connection client module 108 sends a first save request (at 212) to save the monitor layout identifier at the connection server module 110 (which is in the server computer 104). Also, the connection client 108 sends (at 214) a second save request to the connection server module 104 to save the layout of the physical display(s) of the remote computer 102. The layout identifier and the layout properties of the physical display(s) are saved (at 215) in the database 116 as part of the display layout information 112 (FIG. 1). In an alternative implementation, instead of two separate save requests (212 and 214) to save the monitor layout identifier and physical display layout properties, a single save request can be used instead.

Also, the connection client module 108 sends (at 216) a request to the RGS receiver 118 to obtain the layout properties (X,Y coordinates, height, width, etc.) of the local window displayed at the monitor(s) 122 of the thin client 100. Examples of the local window layout properties include an X, Y coordinate of a corner of the local window, and the resolution of the local window (width, height). The local window layout properties are returned (at 218) to the connection client module 108, which in turn sends (at 220) the layout properties of the local window to the connection server 110 for saving (at 222) as part of the display layout information 112 in the database 116.

As noted above, the saved display layout information 112 can later be retrieved on a subsequent connection to the remote computer by a user.

FIG. 3 is a message flow diagram that shows tasks performed by the connection client module 108, RGS receiver 118, RGS sender 120, and connection server module 104 when a user later wishes to use a thin client to connect to one or more remote computers. The connection client 108 receives (at 302) a connect request, which can be based on selection of a "connect" button presented in a GUI at the thin client, or some other type of input, for example. In response to the connect request, the connection client module 108 prompts (at 304) the user to enter user credentials, such as a user name and password. The user credentials are sent (at 306) to the connection server module 104, which responds (at 308) with an authorization message to authorize the user. At this point, the connection server 104 has received information regarding what user is attempting to access a remote computer (or plural remote computers).

Next, the connection client module 108 sets a monitor layout identifier, which is based on the particular layout of the monitor(s) 122 connected to the thin client 100, and sends (at 310) the monitor layout identifier to the connection server module 104. Next, the connection client module 108 sends a request (at 312) for the display layout information. Based on the user identifier (credentials) and the monitor layout identifier, the connection server module 104 performs a lookup of the database 116 (FIG. 1) to determine the remote computer (or remote computers) the thin client should connect to.

The connection server module 104 then sends the corresponding display layout Information (at 314) back to the connection client module 108. In response to receiving the display layout information received at the connection client 108, the connection client module 108 sends (at 336) the display layout information to the RGS receiver 118.

Next, the connection client 108 sends a connect request (at 318) to the RGS receiver 118 to establish a connection with the remote computer (RGS sender 120). In response, the RGS receiver 118 forwards the connect request (at 320) to the RGS sender 120. The RGS receiver 118 also sends (at 322) the display layout information to the RGS sender 120 (note that the RGS receiver 118 is in the thin client 100 white the RGS sender 120 is in the remote computer 102). The display layout information is saved (at 324) by the RGS sender 120. The RGS sender 120 also sets (at 326) the layout of the physical display(s) of the remote computer 102 according to the received display layout information.

In this manner, a previously saved display layout (including local window properties and remote display properties) can be retrieved for re-use in displaying a desktop image of the remote computer at the monitor(s) of the thin client.

Although reference has been made to the thin client connecting to just one remote computer in the example above, it is noted that the thin client can also be directed to connect to multiple remote computers, and to display desktop images of the remote computers in respective local windows of the monitors attached to the thin client. For example, assume there is an array of 2×2 monitors connected to the thin client. If the thin client is directed to connect to two remote computers, then the desktop image of a first remote computer can be displayed in a local window provided on a first pair of the 2×2 monitors, while the desktop image of a second remote computer can be displayed in a local window provided on a second pair of the 2×2 monitors.

Instructions of software described above (including connection client module 108, connection server module 110, remote access client module 118, and remote access server module 120 of FIG. 1) are loaded for execution on a processor (such as CPUs 124, 126, 128 in FIG. 1). The processor includes microprocessors, microcontrollers, processor modules or subsystems (including one or more microprocessors or microcontrollers), or other control or computing devices. A "processor" can refer to a single component or to plural components.

Data and instructions (of the software) are stored in respective storage devices, which are implemented as one or more computer-readable or computer-usable storage media. The storage media include different forms of memory including semiconductor memory devices such as dynamic or static random access memories (DRAMs or SRAMs), erasable and programmable read-only memories (EPROMs), electrically erasable and programmable read-only memories (EE-PROMs) and flash memories; magnetic disks such as fixed, floppy and removable disks; other magnetic media including tape; and optical media such as compact disks (CDs) or digital video disks (DVDs). Note that the instructions of the software discussed above can be provided on one computer-readable or computer-usable storage medium, or alternatively, can be provided on multiple computer-readable or computer-usable storage media distributed in a large system having possibly plural nodes. Such computer-readable or computer-usable storage medium or media is (are) considered to be part of an article (or article of manufacture). An article or article of manufacture can refer to any manufactured single component or multiple components.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. A method of controlling a display layout of a display of a remote computer, comprising:

receiving, at a client computer, at least one user setting for the display layout of the display of the remote computer;

obtaining, by the client computer over a network from the remote computer, information relating to properties of the display layout of the display of the remote computer; and sending, from the client computer, information relating to the display layout over the network to a remote server for storage by the remote server for later retrieval by the client computer when the client computer establishes another connection with the remote computer, wherein the client computer is separate from each of the remote computer and the remote server.

2. The method of claim 1, further comprising:

receiving a user-activated command at the client computer to save information relating to the display layout, wherein the obtaining and sending are in response to the received command to save the display layout.

3. The method of claim 1, further comprising:

obtaining layout information of a local window of at least one monitor attached to the client computer, the at least one monitor being distinct from the display of the remote computer; and sending the local window layout information to the remote server for storage at the remote server for later retrieval by the client computer for the another connection between the client computer and the remote computer.

4. The method of claim 3, further comprising:

displaying an image of the display of the remote computer in the local window displayed by the at least one monitor.

5. The method of claim 3, further comprising:

determining an identifier of a layout of the at least one monitor; and sending, by the client computer to the remote computer, the identifier of the layout with the local window layout information and the display layout of the display of the remote computer.

6. The method of claim 1, further comprising:

after the obtaining, receiving a connect request at the client computer to connect to the remote computer; and in response to the connect request, obtaining the stored display layout information from the remote server.

7. The method of claim 6, further comprising:

in response to the connect request, sending user credential information from the client computer to the remote server; and receiving the stored display layout information from the remote server that is responsive to an identity of a user identified by the user credential information.

8. The method of claim 1, wherein receiving the at least one user setting at the client computer comprises receiving the at least one user setting at a Remote Graphics Software (RGS) receiver running in the client computer, and wherein obtaining the information relating to properties of the display layout of the display of the remote computer comprises the RGS receiver obtaining the information relating to the properties of the display layout from an RGS sender running in the remote computer.

9. An article comprising at least one non-transitory computer-readable storage medium containing instructions that when executed cause a client computer to:

receive a request to connect to a remote computer to access a resource of the remote computer;

in response to the request to connect, send a request for display layout information associated with at least one display of the remote computer; and receive the display layout information from a remote server in response to the request for display layout information, wherein the display layout information was previously saved by the remote server, wherein the client computer is separate from each of the remote computer and the remote server; and communicate the received display layout information to the remote computer to set a display layout of the remote computer according to the received display layout information.

10. The article of claim 9, wherein the instructions when executed cause the client computer to further:

in response to the request to connect, send user credential information to the remote server; and receive authorization from the remote server in response to the user credential information.

11. The article of claim 9, wherein receiving the display layout information comprises receiving display layout properties of the at least one display of the remote computer and receiving display layout properties of a local window to be displayed by at least one monitor connected to the client computer, the at least one monitor being distinct from the at least one display of the remote computer.

12. The article of claim 11, wherein the instructions when executed cause the client computer to further:

display a desktop image associated with the at least one display of the remote computer in the local window.

13. The article of claim 12, wherein the local window is displayed by multiple monitors connected to the client computer.

14. A client computer comprising:

a processor; and software executable on the processor to:

receive at least one user setting for a display layout of at least one display associated with a remote computer;

obtain, from the remote computer, information relating to properties of the display layout of the at least one display;

send information relating to the properties of the display layout to a remote server for storage by the remote server for later retrieval, wherein the client computer is separate from each of the remote computer and the remote server.

15. The client computer of claim 14, wherein the software is executable on the processor to further:

obtain layout information of a local window of at least one monitor attached to the client computer, the at least one monitor being distinct from the at least one display associated with the remote computer; and send the local window layout information to the remote server for storage at the remote server.

16. The method of claim 1, wherein the client computer obtaining the information relating to the properties of the display layout of the display of the remote computer comprises obtaining one or more of a resolution of the display, bits per pixel of the display, and a refresh rate of the display.

17. The article of claim 9, wherein the display layout information comprises one or more of a resolution of the at least one display, bits per pixel of the at least one display, and a refresh rate of the at least one display.

18. The client computer of claim 14, wherein the information relating to the properties comprises one or more of a resolution of the at least one display, bits per pixel of the at least one display, and a refresh rate of the at least one display.

19. The article of claim 9, wherein the display layout information is received by the client computer over a network from the remote server, and wherein the received display layout information is communicated by the client computer over the network to the remote computer.

20. The client computer of claim 14, wherein the client computer is to obtain the information relating to the properties of the display layout over a network from the remote computer, and to send the information relating to the properties of the display layout over the network to the remote server.

\* \* \* \* \*